Sept. 24, 1963

K. C. WALLINGFORD 3,104,485

FISH CATCHER DEVICE

Filed March 13, 1961

INVENTOR.
Kenneth C. Wallingford
BY

ATTORNEY

Sept. 24, 1963     K. C. WALLINGFORD     3,104,485
FISH CATCHER DEVICE
Filed March 13, 1961     2 Sheets-Sheet 2
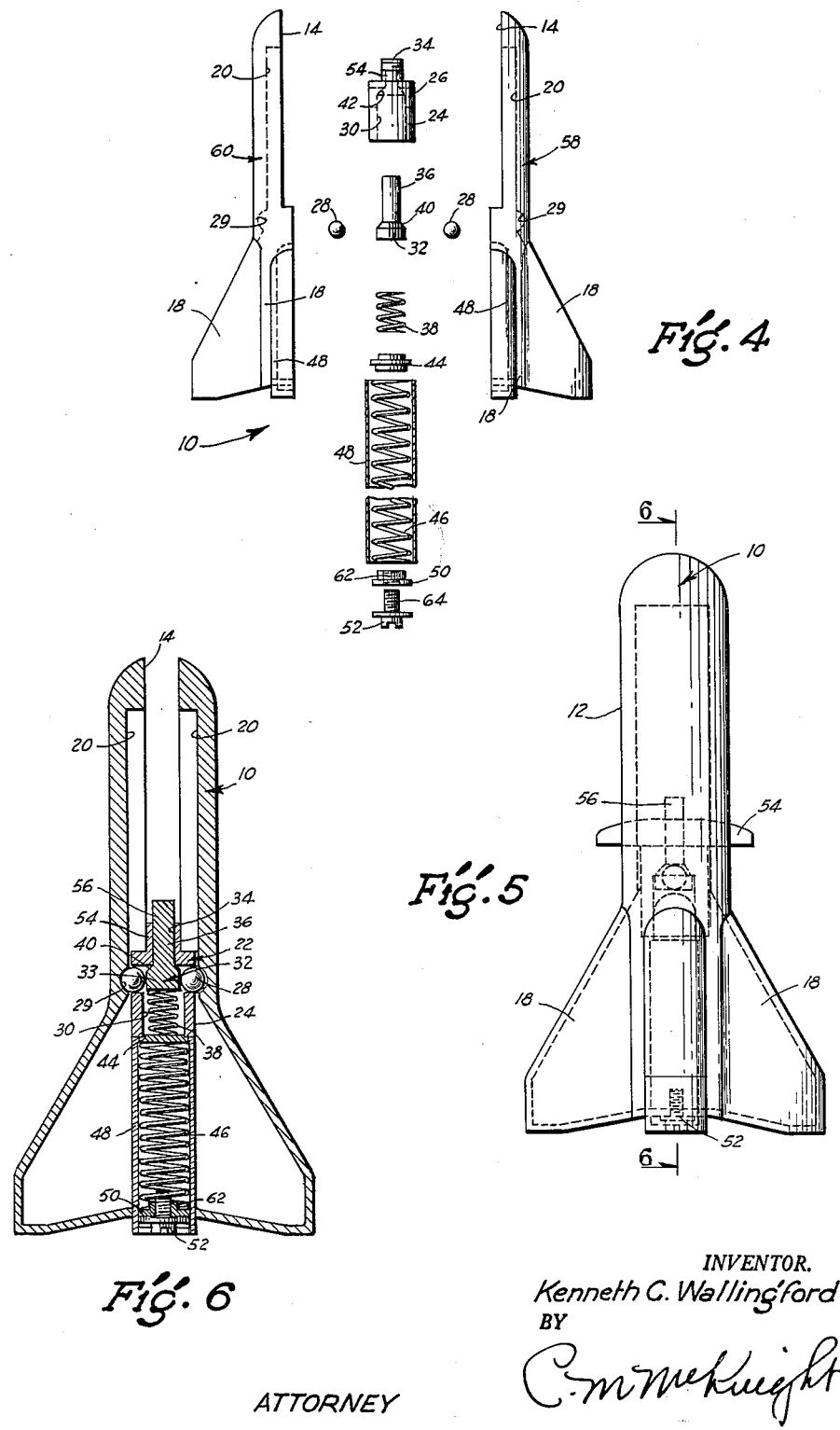
INVENTOR.
Kenneth C. Wallingford

United States Patent Office 3,104,485
Patented Sept. 24, 1963

3,104,485
FISH CATCHER DEVICE
Kenneth C. Wallingford, 2641 S. Oswego Place,
Tulsa, Okla.
Filed Mar. 13, 1961, Ser. No. 95,350
6 Claims. (Cl. 43—15)

This invention relates to improvements in fishing devices and more particularly, but not by way of limitation, to an automatic fish hook setter or fish catcher apparatus.

It is common practice today for a fisherman to utilize a plurality of fish lines simultaneously, and to leave the several lines in the water while watching over all of them. Frequently, the fisherman may leave the line or lines in the water while he is not in attendance, and will return at intervals to check the lines to ascertain whether or not any fish has been caught. When the fisherman is manually holding his rod and has control over the line, he usually jerks the line substantially immediately upon the bite or strike of the fish for firmly setting the fish hook in the mouth of the fish in order to reduce the chance of losing the fish. However, when the fisherman is not in attendance, or when the line is left in the water and the rod is not in the fisherman's hands, the fish is frequently able to grab the bait from the hook and escape since the hook may not be securely set by the nibble at the bait.

The present invention contemplates a novel fish hook setter or fish catcher apparatus for automatically setting the hook in the mouth of a fish when the fish bites or strikes at the bait. The novel fish hook setting device is particularly designed and constructed for disposition on a fishing dock, or the ground, or the like, to support a fishing rod therein. The rod rests on a trigger mechanism whereby the rod is automatically snapped or moved upwardly upon the fish's strike for jerking the line and setting the hook in the fish's mouth, regardless of whether or not the fisherman is at hand. The rod is retained in position within the hook setter device until the fisherman returns for removal thereof. The trigger mechanism may be readily manually reset when the rod is to be used again, and the apparatus may be used repeatedly with efficient results. The novel device is of a small size and light weight structure for convenience, and is simple and efficient in operation and economical and durable in construction.

It is an important object of this invention to provide a novel fish hook setter apparatus for supporting a rod therein regardless of whether the fisherman is in attendance.

It is another object of this invention to provide a novel fish hook setter apparatus for automatically setting the hook in a fish's mouth when the fish strikes at the bait.

Another object of this invention is to provide a novel fish hook setter apparatus wherein the trigger mechanism thereof may be adjusted in accordance with the weight of the rod to provide efficient and automatic setting of the hook in the mouth of the fish.

It is a further object of this invention to provide a novel trigger mechanism which is responsive to pressure for an automatic releasing thereof.

A still further object of this invention is to provide a novel automatic fish hook setter apparatus which is simple and efficient in operation and economical and durable in construction.

Other objects and advantages of the invention will be evident from the following detailed description, read in conjunction with the accompanying drawings, which illustrate my invention.

In the drawings:

FIGURE 4 is an exploded elevational view of the fish hook setter apparatus.

FIGURE 5 is a side elevational view of the fish hook setter apparatus with portions thereof depicted in dotted lines for purposes of illustration.

FIGURE 6 is a sectional elevational view taken on line 6—6 of FIG. 5.

Figure 1:
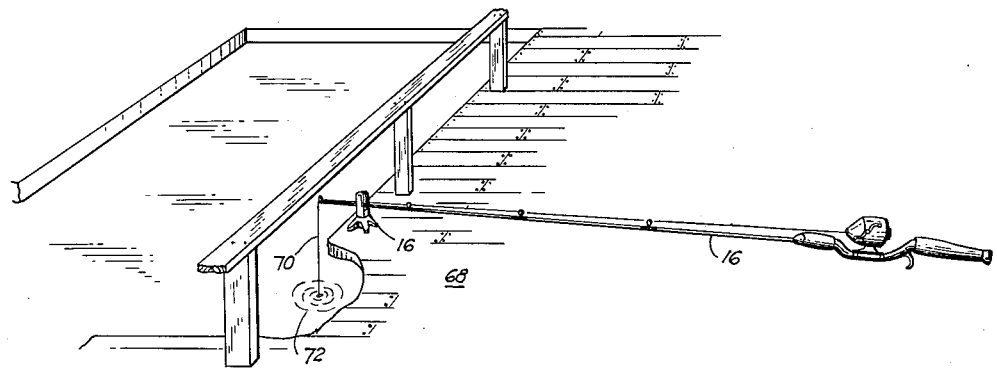
FIGURE 1 is a perspective view of a fishing rod and line resting on a fishing dock and supported by a fish catcher device embodying the invention.

Referring to the drawings in detail, reference character 10 generally indicates a fish hook setter or fish catcher apparatus preferably constructed of a suitable light weight, corrosion resistant metal, such as aluminum, or the like. The fish catcher device 10 comprises an upstanding stem or shank member 12 having a longitudinal slot 14 extending transversely therethrough for receiving a fishing rod 16, or the like. A plurality of radially outwardly extending support members 18 are provided at the lower end of the shank 12 and may be integral therewith, as shown herein, but not limited thereto. The support members 18 cooperate for supporting the shank member 12 in a substantially upright position, and it will be apparent that substantially any type of base member may be provided for the apparatus 10.

The slot 14 is enlarged or provided with a pair of oppositely disposed grooves 20 for receiving a trigger mechanism generally indicated at 22. The trigger mechanism 22 comprises an outer housing or sleeve 24 having a plurality of circumferentially spaced bores 26, preferably two, each for receiving a ball 28 therein. The grooves 20 are provided with aligned annular arcuate grooves or detents 29 for receiving the balls 28 therein. The sleeve 24 is provided with a longitudinally extending internal bore 30 for slidably receiving a trigger stem 32 therein. The bore 30 is reduced at 34 for slidably receiving the reduced neck portion 36 of the stem 32, as clearly shown in FIG. 6. The stem 32 is urged upwardly in the bore 30 by a suitable helical spring 38, and the upward movement of the stem 32 is limited by the engagement of a circumferential shoulder 40 provided thereon with an internal shoulder 42 provided in the housing 24. The lower or open end of the bore 30 is closed by a suitable disc or plate member 44 which retains the spring 38 within the bore 30. The plate member 44 may be secured to the housing in any well known manner (not shown) or may be urged upwardly against the open end of the housing 24 by a suitable helical spring 46 which is disposed within a tubular sleeve portion 48 provided in the base portion 18 of the device 10, as will be hereinafter set forth. The spring 46 constantly urges the housing 24 upwardly within the groove 20. A pressure plate member 50 supports the lower end of the spring 46, and is adjustably secured within the tubular portion 48 by a screw member 52, or the like, as is well known. The plate member 50 may be held against rotation and the screw held against longitudinal movement in any well known manner (not shown) whereby rotation of the screw 52 will be translated into reciprocal movement for the plate 50.

A transversely extending reset lever arm 54 is carried by or integral with the upper end of the housing 24 and is spaced thereon in such a manner that the uppermost portion 56 (FIGS. 2, 5 and 6) of the neck 36 is exposed in the lowered position of the housing 24. The upper end 56 of the stem 32 supports the fishing rod 16, as clearly shown in FIG. 2. With the housing 24 in the lowered position, as particularly shown in FIG. 6, the balls 28 are retained within the groove or detent 29 and the bores 26 by the enlarged portion 33 of the stem 32. In this position, the trigger mechanism 22 is set or locked in the lowered position within the groove 20. Any downward force or pressure on the exposed end 56 of the neck 36 urges the stem 32 downwardly against the action of the spring 38. As the stem 32 moves downwardly with respect to the housing 24, the reduced neck 36 moves into a position adjacent the bores 26 and the balls 28 tend to fall inwardly by gravity against the outer periphery of the neck 36 for releasing the housing 24 from the locked engagement within the groove 20. Upon the release of the housing 24 from the locked position, the spring 46 quickly urges the housing 24 upwardly within the groove 20 with a snap.

In order to reset the trigger mechanism 22, it is merely necessary to manually move the reset lever 54 downwardly within the slot 14 for simultaneously moving the housing 24 downwardly in the groove 20 against the pressure of the spring 46. When the housing 24 has been sufficiently lowered, the bores 26 will be in substantial alignment with the detent 29. The spring 38 will urge the stem 32 upwardly within the housing whereby the shoulders 40 and 42 will be in abutment, thus positioning the enlarged portion 33 of the stem 32 adjacent the bores 26. Thus, the balls 28 are forced into the groove or detent 29 through the bores 26 for locking the mechanism 22 in the set position.

There are many methods of fabrication which may be utilized in the construction of the device 10. The method disclosed herein has proven to be practical and economical, and is one preferred structure. Referring to FIG. 4, the upstanding shank 12 and integral base members 18 are preferably assembled from a pair of substantially identical longitudinal half sections generally indicated at 58 and 60. Each half section 58 and 60 comprises one half of the shank 12, one half of the base members 18, and one half of the tubular sleeve member 48. It will be apparent that each half section 58 and 60 also comprises one half the longitudinal slot 14 and the enlarged portion 20 thereof. Upon assembly of the complete fish hook setter apparatus 10, the trigger mechanism 22 is disposed in one of the half sections, such as the section 58, with one of the balls 28 disposed in the respective detent or groove 29, and the other of said balls 28 exposed. The spring member 46 may also be disposed within the half portion of the tubular member 48, if desired, and the remaining half section, such as the section 60, may then be cemented or otherwise rigidly secured to the half section 58. In this manner, the device 10 becomes a unitary structure. The adjusting screw 52 and spring pressure plate 50 may be secured in position upon assembly of the two half sections 58 and 60, if desired. It is preferable that the tubular member 48 be open at the lower end for receiving the pressure member 50 and screw 52, and also in order that the spring 48 may be inserted therein subsequent to the assembly of the two half sections 58 and 60, if desired. In this manner, the spring 48 may be replaced if it becomes damaged or worn for any reason.

Figure 3:
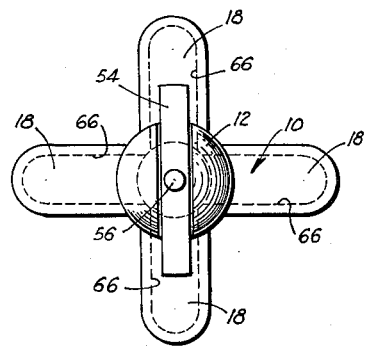
FIGURE 3 is a plan view of the novel fish catcher device.

The pressure member 50 and cooperating adjusting screw 52 may be of any well known type, and as depicted herein, the member 50 is provided with an internal threaded portion 62 for receiving the threaded shank 64 of the screw 52. It is preferable to provide a pair of outwardly extending arms (not shown) on the pressure member 50 adapted for disposition within any complementary or aligned pair of recesses 66 (FIG. 3) provided in the base member 18. The recesses 66 and the arms (not shown) cooperate whereby the member 50 is held against rotation, and will thus move either upwardly or downwardly with respect to the spring 46 upon rotation of the screw 52. In this manner, the tension in the spring 46 may be adjusted in accordance with the desired sensitivity of the trigger mechanism 22.

*Operation*

Figure 2:
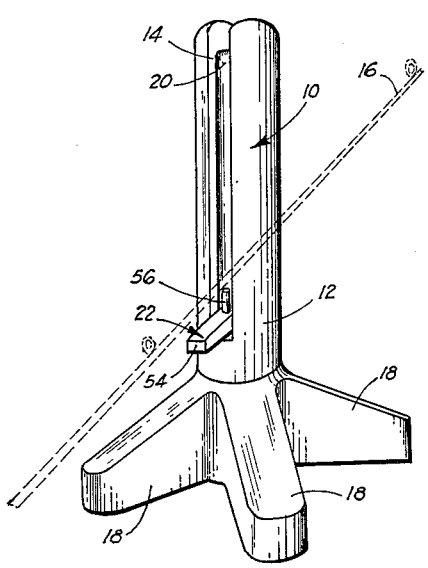
FIGURE 2 is a perspective view of a fish catcher device embodying the invention.

When it is desired to leave the fishing rod or pole 16 unattended on a fishing dock 68, or the like, the rod 16 is disposed within the slot 14 of the automatic fish hook setter device 10 and rests on the exposed end 56 of the trigger mechanism 22, as clearly shown in FIGS. 1 and 2. It is preferable that the rod 16 be disposed within the device 10 in such a manner that approximately three or four inches of the rod 16 extend therebeyond whereby the fish line 70 may be dropped into the water 72 and left therein, as desired.

As long as there is no strike at the fish hook (not shown) which is usually below the surface of the water 72, the device 10 will support the rod 16 as shown. Substantially immediately upon a hit or strike at the fish bait (not shown) by the fish, the pressure exerted on the line 70 will jerk the outer end of the rod 16 downwardly whereby the pressure of the rod 16 on the uppermost end 56 of the trigger mechanism 22 will be increased. This sudden increase in pressure will urge the trigger stem 32 downwardly against the action of the spring 38 whereby the reduced neck portion 36 thereof will be moved adjacent the bores 26. In this position, the balls 28 will fall out of the detents 29 by gravity and into a position adjacent the reduced neck 36, thus releasing the housing 24 from engagement with the groove 20. The spring 46 will snap the housing 24 upwardly, and the entire trigger mechanism 22 will move upwardly within the groove 20, thus imparting a sudden snap or jerk to the rod 16. This fast snapping action will be imparted to the fish hook through the line 70 and will securely set the hook in the mouth of the fish, as is well known. The fish will thus be securely hooked to the line 70 until the fisherman returns.

It will be apparent that the upward movement of the rod 16 is sufficient for imparting the jerk to the fish hook for a setting of the hook in the mouth of the fish, but not sufficient for completely removing the rod 16 from the disposition within the slot 14, thus the rod 16 will remain in the device 10 for support thereby.

When it is desired to reset the trigger mechanism 22, the reset arm 54 may be manually lowered within the slot 15 and against the pressure of the spring 46. As the arm 54 is lowered, the housing 24 will be lowered simultaneously therewith, and the spring 38 will urge the stem 32 upwardly within the housing 24 to the position shown in FIG. 6. As the housing 24 is sufficiently lowered for bringing the bores 26 into register or alignment with the detent 29, the shoulders 40 and 42 will be in abutment and the balls 28 will be urged into the detent 29 by the larger portion of the stem 32. In this manner, the housing 24 is locked within the groove 20, and the trigger mechanism 22 is reset.

As hereinbefore set forth, the tension in the spring 46 may be adjusted by the adjusting screw 52 as desired in accordance with the weight of the rod 16, and the required sensitivity of action for the trigger mechanism 22. The greater the tension in the spring 46, the greater the pressure or force required for releasing the trigger mechanism 22, and conversely, the less the tension in the spring 46, the less pressure required for the release of the trigger mechanism.

It will be readily apparent that the trigger mechanism 22 may be utilized in many environments other than the fish catcher device 10 set forth herein. The simple construction and efficient operation of the trigger mechanism renders it useful for many installations, such as with various types of launching equipment, and the like.

From the foregoing, it will be apparent that the present invention provides a novel fish hook setter or fish catcher apparatus which effectively secures the fish hook in the mouth of the fish upon the absence of attendance of the fisherman. The fishing rod may be supported by the novel fishing device regardless of whether or not the fisherman is at hand, and automatically responds to a strike or bite at the bait for quickly setting the hook and substantially eliminating the loss of the catch. The novel fish hook setter device is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In a fishing device for supporting a fishing rod, a body member, a bifurcated upstanding shank member provided on the body member for receiving the rod therein, said shank member provided with an enlarged groove, a trigger mechanism slidably disposed in the enlarged groove for supporting the rod therein, said trigger mechanism comprising an outer housing engageable with the groove to provide alternate locked and unlocked positions therebetween, ball latch means cooperating between the said outer housing and groove to provide the locked position for the trigger mechanism, a spring urged trigger stem slidably disposed within the housing and extending upwardly therethrough for engagement with the rod and automatically responsive to an increase in pressure from the rod for releasing the housing from the locked position with the groove, and resilient means for urging the housing upwardly in the released position thereof for imparting an upward movement to the rod.

2. In a fishing device for supporting a fishing rod, a body member, a bifurcated upstanding shank member provided on the body member for receiving the rod therein, said shank member provided with an enlarged groove, a trigger mechanism slidably disposed in the enlarged groove for supporting the rod therein, said trigger mechanism comprising an outer housing, a spring urged trigger stem slidably disposed within the housing and extending therethrough for engagement with the rod, ball latch means cooperating between the housing and trigger stem for providing alternate locked and unlocked engagement between the housing and the enlarged groove, said trigger stem automatically responsive to an increase in pressure from the rod for actuating the ball latch means to release the housing from the locked position in the groove, and resilient means for urging the housing upwardly in the released position thereof for imparting an upward movement to the rod.

3. In a fishing device for supporting a fishing rod, a body member, a bifurcated upstanding shank member provided on the body member for receiving the rod therein, said shank member provided with an enlarged groove, a trigger mechanism slidably disposed in the enlarged groove for supporting the rod therein, said trigger mechanism comprising an outer housing, a spring urged trigger stem slidably disposed within the housing and extending upwardly therethrough for engagement with the rod, ball latch means cooperating between the housing and trigger stem for providing alternate locked and unlocked engagement between the housing and the enlarged groove, said trigger stem automatically responsive to an increase in pressure from the rod for actuating the ball latch means to release the housing from the locked position in the groove, resilient means for urging the housing upwardly in the released position thereof for imparting an upward movement to the rod, and reset lever means provided in the housing for moving the housing downwardly in the groove to actuate the ball latch means to provide a locking engagement between the housing and the groove.

4. A trigger mechanism comprising an outer casing member, a housing slidably disposed in the outer casing member, a trigger stem slidably disposed within the housing and extending upwardly therethrough, ball latch means co-operating between the trigger stem and the housing and detent means provided in the casing member to provide alternate locked and unlocked engagement of the housing with the casing member, resilient means cooperating with said trigger stem and housing and responsive to an increased pressure for automatically actuating the ball latch means for releasing the housing from the locked engagement with the casing member and moving the trigger stem and housing upwardly, said resilient means including a first spring engageable with the trigger stem for constantly urging the stem in one direction and a second spring member engageable with the housing for constantly urging the housing in said one direction, and reset means carried by the housing for actuating the ball latch means to reset the housing in the locked position with the casing member.

5. A trigger mechanism for supporting a fishing rod comprising an outer casing member, a housing slidably disposed in the outer casing member, a spring urged trigger stem slidably disposed within the housing and extending upwardly therethrough for engagement with the rod, ball latch means cooperating between the trigger stem and the housing and detent means provided in the casing member to provide alternate locked and unlocked engagement of the housing with the casing member, first resilient means cooperating with said trigger stem and responsive to an increased pressure for automatically actuating the ball latch means for releasing the housing from the locked engagement with the casing member and moving the stem upwardly, second resilient means constantly urging the housing upwardly within the casing member for an upward movement of the housing in the unlocked position thereof, and reset means for moving the housing downwardly against the action of the resilient means to actuate the ball latch means for locking the housing in the casing member.

6. In a fishing device for supporting a fishing rod, a body member, bifurcated shank member provided on the body member for receiving the rod therein, said shank member provided with an enlarged groove, a trigger mechanism slidably disposed in the enlarged groove for supporting the rod therein, said trigger mechanism comprising an outer housing, a trigger stem slidably disposed within the outer housing and extending upwardly therethrough for engaging the rod, locking means comprising cooperating ball and detent means for locking the trigger mechanism in a depressed position within the bifurcated shank member, first resilient means engageable with the trigger stem and responsive to an increased pressure from the rod for releasing the trigger mechanism from the locked position, and second resilient means for snapping the housing and stem and rod upwardly within the shank member upon release of the locking position of the trigger mechanism.

References Cited in the file of this patent

UNITED STATES PATENTS

| | | |
|---|---|---|
| 371,777 | McCabe | Oct. 18, 1887 |
| 2,419,378 | Thomas et al. | Apr. 22, 1947 |
| 2,638,696 | Derkovitz | May 19, 1953 |
| 2,843,962 | Porter | July 22, 1958 |

FOREIGN PATENTS

| | | |
|---|---|---|
| 763,268 | France | Feb. 12, 1934 |
| 1,124,821 | France | July 2, 1956 |